United States Patent [19]
Kato et al.

[11] Patent Number: 6,018,446
[45] Date of Patent: Jan. 25, 2000

[54] MAGNETIC DISC CARTRIDGE WITH SHUTTER SPRING

[75] Inventors: Shinichi Kato; Akira Inaba; Kengo Oishi, all of Kanagawa-ken, Japan

[73] Assignee: Fuji Photo Film Co., Ltd., Kanagawa-ken, Japan

[21] Appl. No.: 09/072,727

[22] Filed: May 6, 1998

[30] Foreign Application Priority Data

| May 8, 1997 | [JP] | Japan | 9-118377 |
| Sep. 17, 1997 | [JP] | Japan | 9-251660 |

[51] Int. Cl.$^7$ ............................................. G11B 23/03
[52] U.S. Cl. ............................................................. 360/133
[58] Field of Search .................................................. 360/133

[56] References Cited

U.S. PATENT DOCUMENTS

| 4,851,948 | 7/1989 | Kato et al. | 360/133 |
| 4,853,925 | 8/1989 | Kaneuchi | 369/291 |

FOREIGN PATENT DOCUMENTS

| 0 266 781 | 5/1988 | European Pat. Off. | G11B 23/03 |
| 0 369 651 | 5/1990 | European Pat. Off. | G11B 23/03 |
| 8-124344 | 5/1996 | Japan | G11B 23/03 |
| 9-73749 | 3/1997 | Japan | G11B 23/03 |

*Primary Examiner*—A. J. Heinz
*Attorney, Agent, or Firm*—Sughrue, Mion, Zinn, Macpeak & Seas, PLLC

[57] ABSTRACT

In a magnetic disc cartridge, a magnetic disc is contained for rotation in a casing which is provided with a magnetic head insertion opening and a shutter member for opening and closing the magnetic head insertion opening. The shutter member is urged by a shutter spring to a closing position in which it closes the magnetic head insertion opening. The shutter spring is formed of a coiled metal spring which is engaged with the casing at one end and with the shutter member at the other end and urges the shutter member to the closing position under its resiliency generated by deflection thereof.

10 Claims, 6 Drawing Sheets

PRIOR ART

MAGNETIC DISC CARTRIDGE WITH SHUTTER SPRING

BACKGROUND OF THE INVENTION

1. Field of the Invention

This invention relates to a magnetic disc cartridge which comprises a magnetic disc contained in a casing, and more particularly to a shutter spring for urging a shutter member for opening and closing a magnetic head insertion opening of the casing and a structure for incorporating the shutter member.

2. Description of the Related Art

There has been known a magnetic disc, a so-called floppy disc, which comprises magnetic layers formed on opposite sides of a flexible disc base of a polyester sheet or the like. Information is recorded on the floppy disc by a magnetic head while rotating the floppy disc. Further there has been provided a magnetic disc cartridge comprising a thin casing and a magnetic disc contained in the casing. Such magnetic disc cartridges have been mainly used as recording media for computers because they are easy to handle and available at low cost.

The magnetic disc cartridge is provided with a magnetic head insertion opening for giving a magnetic head access to each side of the magnetic disc for recording and reproduction. The magnetic head insertion opening is provided with a shutter member which closes the opening when the magnetic disc cartridge is not in use in order to prevent dust and/or dirt from entering the casing.

The recording capacity of the magnetic disc has been increased through improvement in line recording density and track density by change in the recording system and/or improvement in the magnetic layer. In the magnetic disc cartridge of an increased recording capacity, it is necessary to improve the dust-proof performance of the casing in order to avoid adhesion of foreign matters as much as possible, thereby improving reliability of the magnetic disc cartridge.

When a magnetic disc cartridge larger than conventional magnetic disc cartridges in recording capacity is developed, a novel disc drive system for driving the magnetic disc cartridge having a larger recording capacity is provided. Such a novel disc drive system is generally arranged to be able to drive magnetic disc cartridges having smaller storage capacities as well as the newly developed larger capacity magnetic disc cartridge. Such capability of driving magnetic disc cartridges having smaller recording capacities as well as the newly developed larger capacity magnetic disc cartridge will be referred to as "downward compatibilities", hereinbelow.

In order to provide such downward compatibilities to the disc drive system for the larger capacity magnetic disc cartridge, the novel larger capacity magnetic disc cartridge must be substantially equal to the conventional magnetic disc cartridge in principal dimensions and structure.

Since the conventional small capacity magnetic disc cartridge is not so high in dust-proof performance, the larger capacity magnetic disc cartridge must be improved in dust-proof performance without essentially changing the principal dimensions and the structure in order to obtain the downward compatibilities.

An approach is to close a spindle hole when the magnetic disc cartridge is not in use, which hole is formed in the lower surface of the casing in order to give a spindle of a disc drive system access to a center core of the magnetic disc. The spindle hole is kept open even if the magnetic disc cartridge is stored, in the conventional magnetic disc cartridge where the dust-proof performance need not be so high. For example, the spindle hole can be closed by a shutter member for opening and closing the magnetic head insertion opening, as disclosed in our Japanese Patent Application 9(1997)-90620.

In this case, since the diameter of the spindle hole is larger than the width of the magnetic head insertion opening, the shutter member must be slid by a larger distance, which results in the necessity of increasing the stroke of a shutter spring for urging the shutter member to its closing position. In the conventional magnetic disc cartridge, a coiled torsion spring defined in JISB0103 is used. Attempts to increase the stroke of such a shutter spring gives rise to a problem that the overall size of the shutter spring has to become large in order to ensure a desired stroke and a space for permitting deformation of such a large spring has to be conserved.

Specifically, the conventional shutter spring of a coiled torsion spring comprises a coiled central portion of several turns and linear end portions extending in two directions from opposite ends of the central portion. One end portion of the shutter spring is fixed to the casing and the other end portion of the shutter spring is fixed to the shutter member. When the shutter member is opened or closed, the end portion fixed to the shutter member makes a linear motion and the coiled central portion makes a circular motion about the end portion fixed to the casing. In order to increase the stroke of such a shutter spring, the opposite end portions of the spring must be elongated. When the end portions are elongated, the path of the circular motion of the central portion and the path of the linear motion of the end portion are extended toward the axis of rotation of the magnetic disc to interfere with the magnetic disc.

Figure 12:
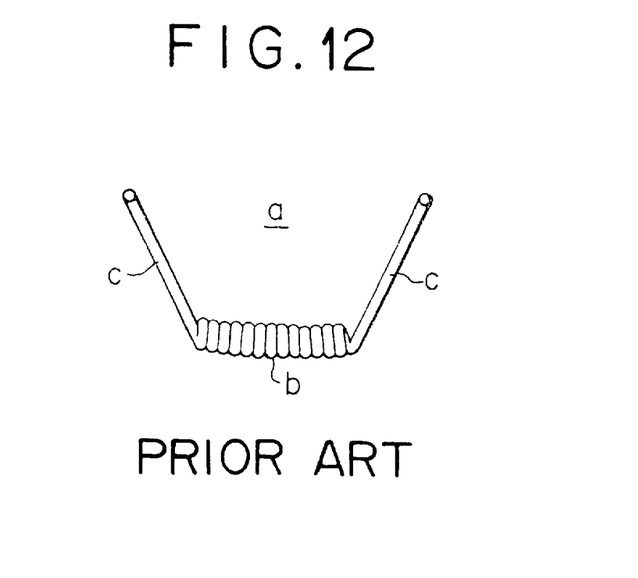

The coiled torsion spring may be replaced with a shutter spring disclosed in Japanese Unexamined Patent Publication No. 9(1997)-73749. As shown in FIG. 12, the shutter spring a comprises a coiled portion b and a pair of arms c extending from opposite ends of the coiled portion b. In this shutter spring, the central coiled portion b undergoes deformation in bend but not in torsion unlike the conventional coiled torsion spring, and accordingly the repetitional durability is improved.

However since the shutter spring only differs from the coiled torsion spring in that the coiled portion is deformed not in torsion but in bend, the arms must be elongated in order to increase the stroke of the shutter spring. This point is the same for all the conventional coiled torsion springs.

SUMMARY OF THE INVENTION

In view of the foregoing observations and description, the primary object of the present invention is to provide a magnetic disc cartridge having a shutter spring which can provide a large stroke corresponding to an increased distance of movement of a shutter member without interference with the area of rotation of the magnetic disc.

Another object of the present invention is to provide a magnetic disc cartridge having a structure which facilitates incorporation of the novel shutter spring, preventing the shutter spring from getting out of place, and changing in spring properties and the like.

In accordance with the present invention, there is provided a magnetic disc cartridge comprising a magnetic disc contained for rotation in a casing which is provided with a magnetic head insertion opening and a shutter member for opening and closing the magnetic head insertion opening, the shutter member being urged by a shutter spring to a closing position in which it closes the magnetic head insertion opening, comprising the shutter spring is formed of a coiled metal spring which is engaged with the casing at one end and with the shutter member at the other end and urges the shutter member to the closing position under its resiliency generated by its deflection thereof.

The shutter spring is a closely wound coiled metal spring which is strong in initial torsion. The whole body of the shutter spring is continuously deformed substantially into a U-shape in response to movement of the shutter member to the opening position and the shutter member is urged to the closing position under resiliency which is generated by the deformation of the spring body and tends to return the spring body to its normal shape. The shutter spring is disposed in the casing outside the area of rotation of the magnetic disc.

It is preferred that a wall portion for guiding deformation of the shutter spring body be formed in the casing along the space in which the shutter spring is accommodated. Further it is preferred that hooks be provided on opposite ends of the shutter spring and the ends of the shutter spring be fixed to the casing and the shutter member by way of the hooks.

In one embodiment of the present invention, the casing is provided with an outer peripheral wall and an inner wall which extends along the outer peripheral edge of the magnetic disc, a shutter spring container space for containing therein the shutter spring is formed between the outer peripheral wall and the inner wall, an engagement projection for engagement with one end portion of the shutter spring is formed on the shutter member and a projected wall portion is formed to project from the inner wall defining the shutter spring container space toward the position where the engagement projection on the shutter member is when the shutter member is in the closing position.

In the case of a magnetic disc cartridge where the projected wall portion is formed, a shutter spring without a hook can be incorporated easily. That is, when the shutter spring is inserted into the shutter spring container space with the shutter spring bent into a U-shape and the ends of the shutter spring are released, the shutter spring expands and the end portions of the shutter spring rest on the inner surface of the outer peripheral wall and the engagement projection on the shutter member. At this time the projected wall portion prevents the end portion of the shutter spring on the shutter member side from expanding over the engagement projection, thereby preventing failure in incorporation.

It is preferred that the end of the projected wall portion be spaced from the engagement projection by a distance which is sufficient to prevent the wall portion from interfering with opening and closing the shutter member and is smaller than the diameter of the shutter spring. Further it is preferred that the side surface of the projected wall portion facing the shutter spring be substantially flush with the shutter spring side surface of the engagement projection or shifted toward the shutter spring. Further it is preferred that the projected wall portion be formed integrally with said inner wall and the shutter spring side surface thereof extends in perpendicular to the direction of movement of the shutter member or obliquely toward the engagement projection of the shutter member. Further it is preferred that an engagement projection be formed on the casing to project from the front edge thereof so that the end portion of the shutter spring rests on the engagement projection and the shutter member side surface of the engagement projection be inclined or curved so that the free end portion of the surface approaches the shutter member.

In another embodiment of the present invention, the casing is provided with an outer peripheral wall and an inner wall which extends along the outer peripheral edge of the magnetic disc, a shutter spring container space for containing therein the shutter spring is formed between the outer peripheral wall and the inner wall, an engagement projection for engagement with one end portion of the shutter spring is formed on the shutter member and a bottom position limiting member is formed in the shutter spring container space to be brought into contact with an intermediate portion of the shutter spring when the shutter spring is deflected more than the degree to which the shutter spring is deflected during movement of the shutter member to the opening position at most, thereby preventing the ends of the shutter spring from being disengaged from the engagement projections on the shutter member and the casing.

The bottom position limiting member prevents the ends of the shutter spring from moving away from the engagement projections on the shutter member and the casing when the shutter spring is deflected, for instance, during incorporation of the shutter spring more than the degree to which the shutter spring is deflected during movement of the shutter member to the opening position at most, thereby keeping the ends of the shutter spring engaged with the engagement projections.

The bottom position limiting member is preferably formed integrally with the inner wall.

In still another embodiment of the present invention, the shutter member is provided with an engagement projection which is engaged with an end portion of the shutter spring and the end portion of the shutter spring is fixedly held on the engagement projection so that the end portion extends substantially in parallel or at an angle to the direction of movement of the shutter member.

When one end portion of the shutter spring is fixed, the shutter spring comes to be bent in a relatively fixed position and spring properties similar to those of the conventional coiled torsion spring can be obtained.

In this embodiment, it is preferred that assembly of the magnetic disc cartridge be performed with one end portion of the shutter spring fixed to the shutter member. The end portion of the shutter spring is preferably fixed to the engagement projection of the shutter member by insertion, press fitting, caulking or the like. The engagement projection on the shutter member may be formed by stamping and erecting a part of the shutter member or may be formed separately from the shutter member and fixed to the shutter member.

In accordance with the present invention, since the shutter member is urged under resiliency generated by deflection of a coiled metal spring, the stroke of the shutter spring can be increased to conform to an increased distance of the shutter member and accordingly it becomes possible, for instance, to close the spindle hole with the shutter member for the magnetic head insertion opening, whereby the dust-proof performance of a larger capacity magnetic disc cartridge can be improved in order to obtain the downward compatibilities. Further since being large in freedom of shape when it is deformed, the coiled metal spring can be contained in a relatively narrow space in the casing by deforming the coiled metal spring to a shape conforming to the shape of the space.

When a wall portion for guiding deformation of the shutter spring body is formed in the casing, it becomes easy to ensure a space for accommodating the shutter spring as the freedom of deformation of the shutter spring increases.

When a projected wall portion is formed to project from the inner wall defining the shutter spring container space toward the position where the engagement projection on the shutter member is when the shutter member is in the closing position, the shutter spring can be incorporated easily. That is, when the shutter spring is inserted into the shutter spring container space with the shutter spring bent into a U-shape and the ends of the shutter spring are released, the end portions of the shutter spring are surely engaged with the inner surface of the outer peripheral wall and the engagement projection on the shutter member by virtue of the projected wall portion.

When a bottom position limiting member is formed in the shutter spring container space, the bottom position limiting member prevents the ends of the shutter spring from moving away from the engagement projections on the shutter member and the casing when the shutter spring is excessively deflected, thereby keeping the ends of the shutter spring engaged with the engagement projections.

When one end portion of the shutter spring is fixed, spring properties similar to those of the conventional coiled torsion spring can be obtained and the magnetic disc cartridge of the present invention can have shutter member opening and closing characteristics similar to those in the conventional magnetic disc cartridge.

DESCRIPTION OF THE PREFERRED EMBODIMENTS

First Embodiment

Figure 1:
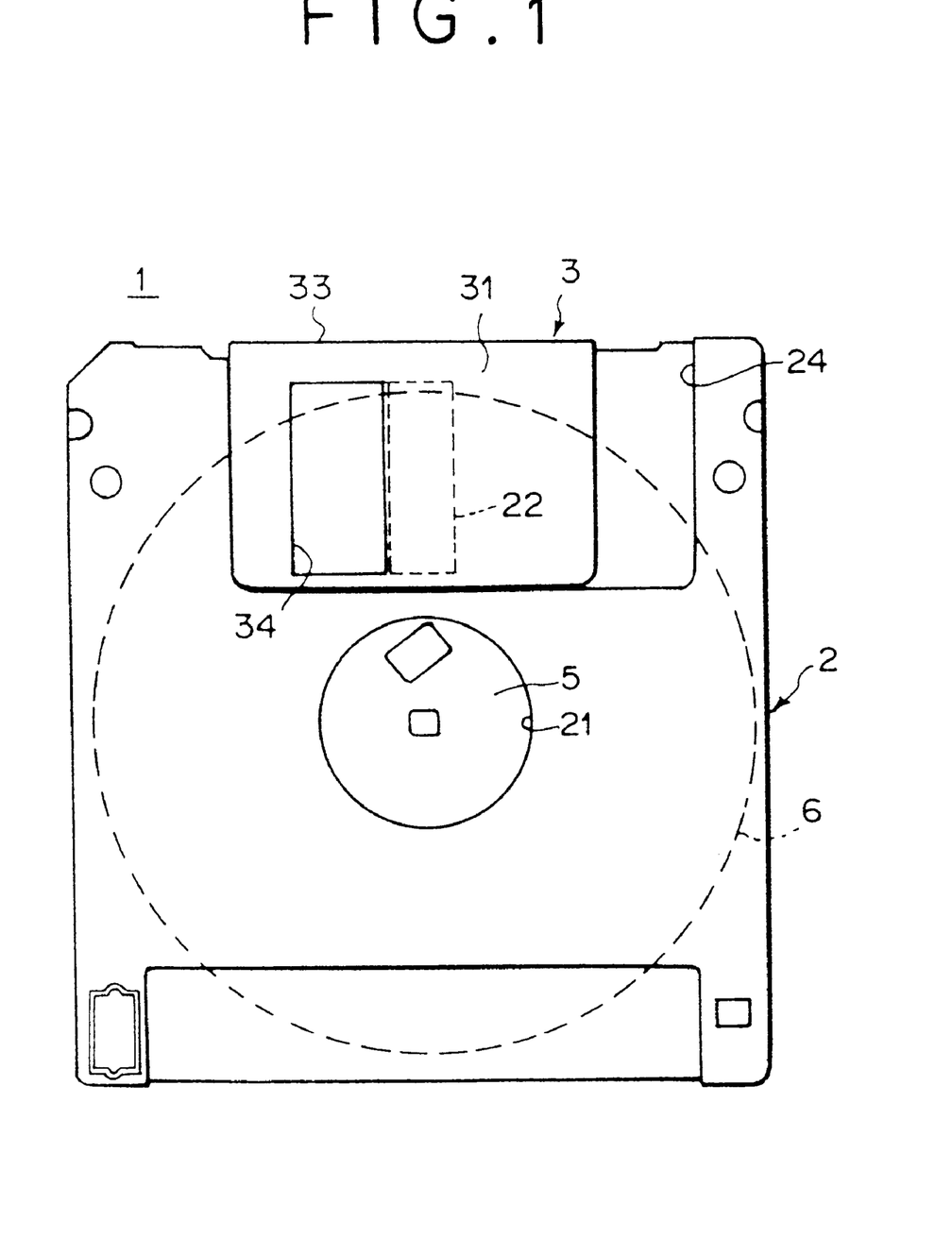
FIG. 1 is a bottom view of a magnetic disc cartridge in accordance with a first embodiment of the present invention.
Figure 2:
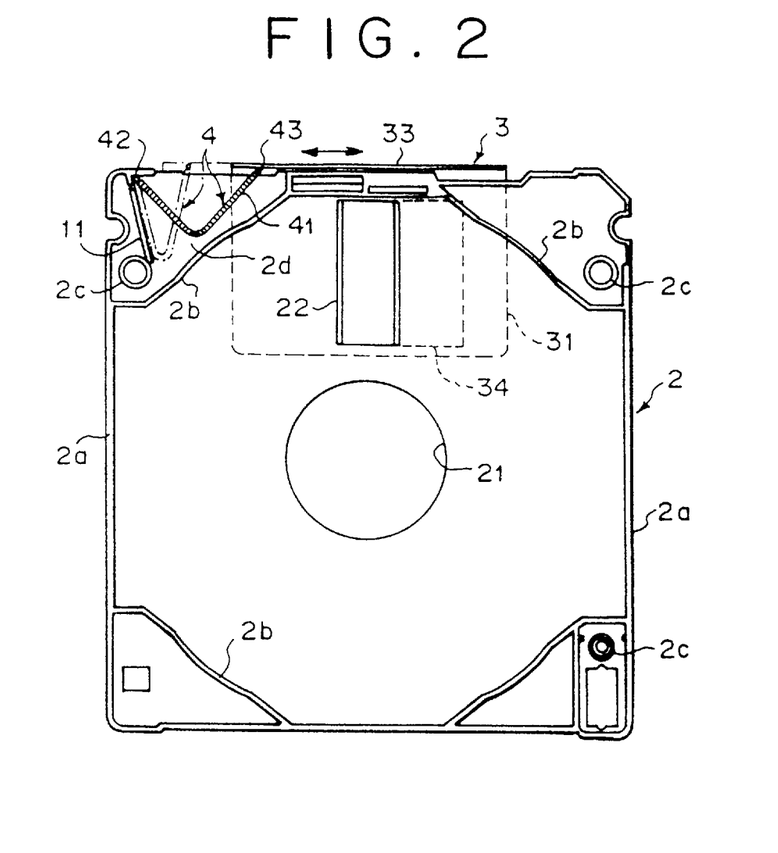
FIG. 2 is a plan view of the lower shell half of the magnetic disc cartridge shown in FIG. 1.

In FIGS. 1 and 2, a magnetic disc cartridge 1 in accordance with a first embodiment of the present invention comprises a casing (hard casing) 2 formed of synthetic resin such as acrylonitrile-butadiene-styrene copolymer. A magnetic disc 6 provided with a center core 5 fixed to its center is contained in the casing 2 to be rotatable therein. The magnetic disc 6 comprises magnetic layers formed on opposite sides of a flexible disc base of a polyester sheet or the like.

The casing 2 comprises upper and lower shell halves mated together and the center core 5 of the magnetic disc 6 is exposed through a spindle hole 21 formed in the lower side of the casing 2. A spindle of a disc drive system (not shown) is inserted through the spindle hole 21 into the casing 2 to drive the magnetic disc 6. A rectangular magnetic head insertion opening 22 is formed on each side of the casing 2. A shutter member 3 for closing and opening the magnetic head insertion openings 22 is mounted on the casing 2 to be slidable left and right in a shallow recess on the casing 2.

The shutter member 3 is formed of a metal plate such as a stainless steel plate or an aluminum plate and is channel-shaped in cross-section. That is, the shutter member 3 comprises upper and lower plate portions 31 connected by a connecting portion 33. Each of the upper and lower plate portions 31 is provided with an opening 34 which is out of alignment with the magnetic head insertion opening 22 when the shutter member 3 is in its closed position shown by the solid line in FIG. 1, thereby closing the magnetic head insertion opening 22 to prevent foreign matters such as dust from entering the casing 2, and is brought into alignment with the magnetic head insertion opening 22 when the shutter member 3 is moved to its opening position shown by the dashed line in FIG. 1.

The lower plate portion 31 may be extended to be able to close and open the spindle hole 21 together with the magnetic head insertion opening 22.

As shown in FIG. 2, an outer peripheral wall 2a which forms a side wall of the casing 2 is formed on the inner surface of each shell half and an inner wall 2b is obliquely formed on the inner surface at each corner. The magnetic disc 6 is contained inside the inner walls 2b and the upper and lower shell halves are mated together with projections 2c opposed to each other. A triangular space formed by the inner wall 2b and the outer peripheral wall 2a at the left front corner of the casing 2 forms a shutter spring container space 2d for containing therein a shutter spring 4 for urging the shutter member 3 to the closing position.

Figure 3:
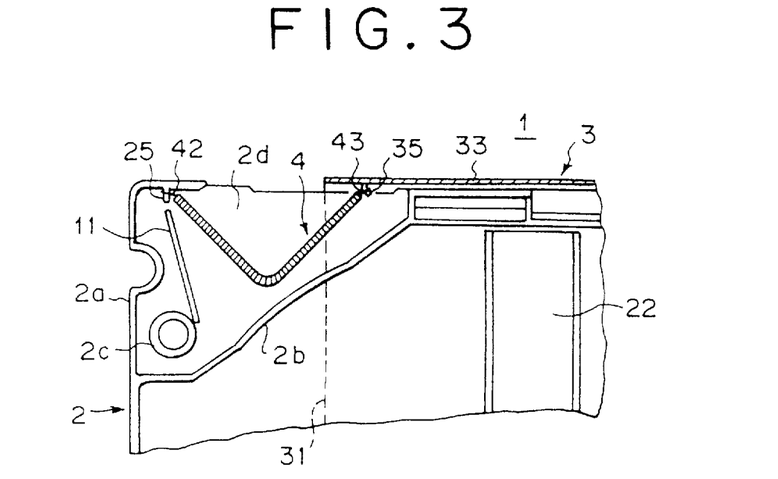
FIG. 3 is an enlarged fragmentary plan view showing an important part of FIG. 2.
Figure 4:
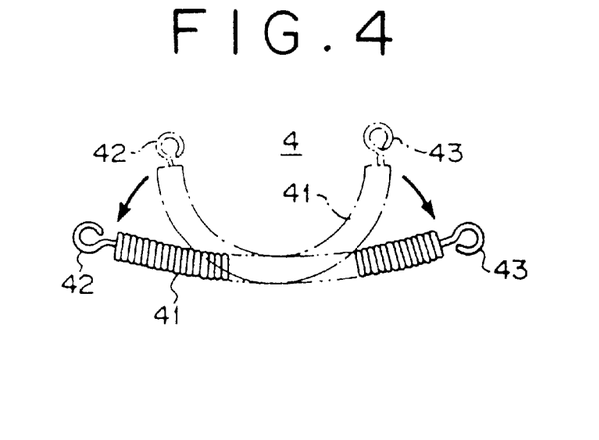
FIG. 4 is a view showing in detail the shutter spring employed in the magnetic disc cartridge shown in FIG. 1.

As shown in FIG. 4, the shutter spring 4 comprises a coiled metal spring 41 which is closely wound and slightly curved and a pair of hooks 42 and 43 connected to the respective ends of the coiled metal spring 41. The hook 42 on one end of the coiled metal spring 41 is engaged with an engagement projection 25 on the casing 2 and the hook 43 on the other end of the coiled metal spring 41 is engaged with an engagement projection 35 on the connecting portion 33 of the shutter member 3 as shown in FIG. 3 so that the shutter spring 4 urges the shutter member 3 toward the closing position under resiliency of the coiled metal spring 41 which is generated by deflection of the coiled metal spring 41 at an intermediate portion thereof.

Since the coiled metal spring 41 is closely wound, the shutter spring 4 is strong in initial torsion, and when the whole body of the shutter spring 4 is continuously deformed as shown by the chained line in FIG. 4, resiliency which tends to return the spring body to its normal shape shown by the solid line is generated. When the shutter member 3 is held in the closing position shown in FIG. 2, the space between the ends of the shutter spring 4 is relatively wide and the shutter spring 4 forms a relatively large angle, and when the shutter member 3 is opened, the space between the ends of the shutter spring 4 is narrowed and the angle formed by the shutter spring 4 is narrowed and this deformation of the shutter spring 4 produces resiliency to urge the shutter member 3 toward the closing position.

A wall portion 11 for guiding deformation of the shutter spring body is formed in the shutter spring container space 2d obliquely along the outer peripheral wall 2a of the casing 2.

Since the coiled metal spring 41 is large in freedom of shape into which it is deformed, the shutter spring 4 can be contained in a relatively narrow space in the casing by deforming the coiled metal spring 41 to a shape conforming to the shape of the space.

Figure 5:
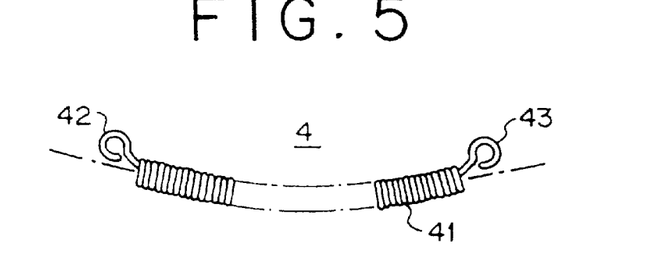
FIG. 5 is a view showing in detail a modification of the shutter spring.

FIG. 5 shows a modification of the shutter spring 4. In the shutter spring 4 shown in FIG. 4, the hooks 42 and 43 are connected to the ends of the coiled metal spring 41 on the longitudinal axis thereof. In contrast, in the shutter spring 4 shown in FIG. 5, the hooks 42 and 43 are connected to the ends of the coiled metal spring 41 off the longitudinal axis thereof. With this arrangement, deformation of the coiled metal spring 41 due to displacement of hooks 42 and 43 in response to movement of the shutter member 3 is facilitated. The offset of the hooks 42 and 43 may be selected according to the condition of design and/or use.

Though in the embodiment described above the shutter spring 4 is slightly bent when the shutter member 3 is in the closing position and the whole body of the shutter spring 4 is continuously deformed in bend as the shutter member 4 approaches the opening position, deformation of the shutter spring 4 need not be continuous but the shutter spring 4 may be variously deformed according to the shape, position and the like of the wall portion 11 for guiding deformation of the shutter spring body. Further the shutter spring 4 may be straight when the shutter member 4 is in the closing position.

The metal wire forming the coiled metal spring 41 need not be uniform in diameter and the diameter of the metal wire may be reduced at a part of the spring 41 at which the spring 41 is to be bent on purpose. Also the diameter of the coiled metal spring 41 need not be uniform over the entire length thereof and the diameter of the coiled metal spring 41 may be reduced at a part of the spring 41 at which the spring 41 is to be bent on purpose. The diameter of the metal wire forming the coiled metal spring 41 and or the diameter of the coiled metal spring 41 may be selected according to the condition of design and/or use.

Second Embodiment

Figure 6:
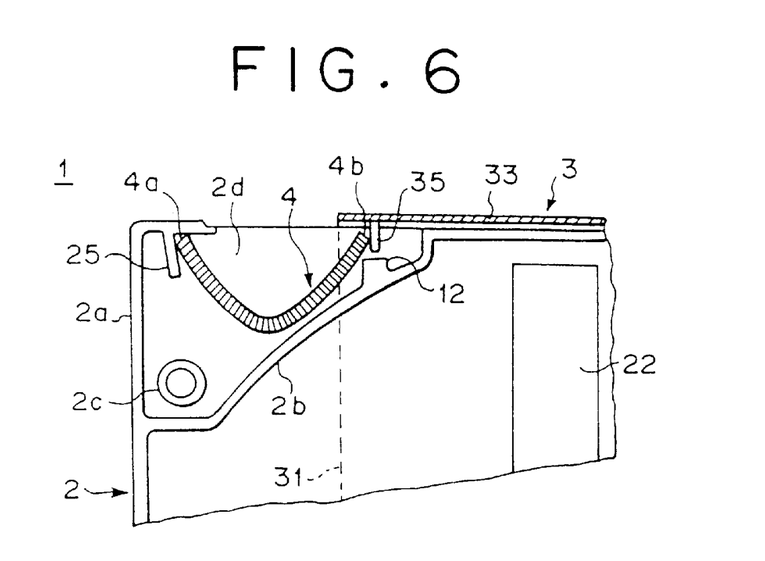
FIG. 6 is a plan view of an important part of the lower shell half of a magnetic disc cartridge in accordance with a second embodiment of the present invention.

A magnetic disc cartridge 1 in accordance with a second embodiment of the present invention will be described with reference to FIGS. 6 and 7, hereinbelow.

In this embodiment, the shutter spring 4 for urging the shutter member 4 toward the closing position comprises a coiled metal spring which is closely wound and is not provided with a hook. The shutter spring 4 is kept deflected even when the shutter member 3 is in the closing position.

One end portion 4a of the shutter spring 4 is in abutment against an engagement projection 25 on the left front corner of the casing 2 in the shutter spring container space 2d and the other end portion 4b of the shutter spring 4 is in abutment against an engagement projection 35 on the connecting portion 33 of the shutter member 3.

A projected wall portion 12 is formed in the shutter spring container space 2d to project from the inner wall 2b toward the position where the engagement projection 35 is when the shutter member 3 is in the closing position.

The projected wall portion 12 narrows the gap between the tip of the engagement projection 35 on the shutter member 3 and the inner wall 2b so that the end portion 4b of the shutter spring 4 cannot enter the space therebetween. That is, the distance d (FIG. 7) between the end face 12a of the projected wall portion 12 and the tip of the engagement projection 35 is sufficient to prevent the wall portion 12 from interfering with opening and closing the shutter member 3 and is smaller than the diameter of the shutter spring 4.

The shutter spring side surface 12b of the projected wall portion 12 extends perpendicular to the direction of movement of the shutter member 3. It is preferred that the shutter spring side surface 12b of the projected wall portion 12 be not shifted toward the shutter member 3 from the abutment surface 35a of the engagement projection 35 but be in alignment with the abutment surface 35a or shifted therefrom toward the shutter spring 4 as shown by the solid line in FIG. 7.

Figure 7:
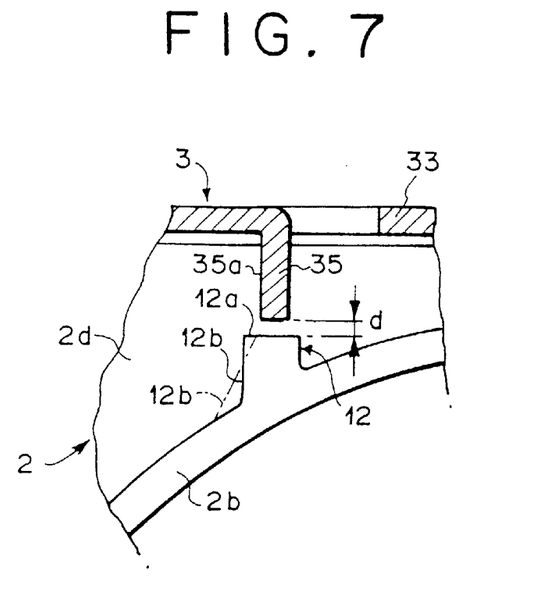
FIG. 7 is an enlarged fragmentary plan view showing an important part of FIG. 6.

The shutter spring side surface 12b of the projected wall portion 12 may be inclined (or curved) toward the engagement projection 35 as shown by the chained line in FIG. 7 so that the end portion 4b of the shutter spring 4 is moved toward the engagement projection 35 when the end portion 4b of the shutter spring 4 is brought into abutment against the surface 12b.

When the thickness of the engagement projection 35 on the shutter member 4 is small and gaps larger than the diameter of the shutter spring 4 are formed between the lower surface of the engagement projection 35 and the lower inner surface of the casing 2 and between the upper surface of the engagement projection 35 and the upper inner surface of the casing 2, extensions which extend respectively from upper and lower portions of the projected wall portion 12 into the gaps between the inner surfaces of the casing 2 and the engagement projection 35 and opposed to the upper and lower surfaces of the engagement projection 35 at distances equivalent to the aforesaid distance d may be formed on the projected wall portion 12.

The shutter member side surface of the engagement projection 25 on the casing 2 may be inclined or curved so that the free end portion of the surface approaches the shutter member 3, thereby ensuring that the end portion 4a of the shutter spring 4 rests on the base portion thereof.

In this embodiment, when incorporating the shutter spring 4 in the casing 2, the shutter spring 4 is bent into a U-shape by pressing opposite ends toward each other and the shutter spring 4 is inserted into the shutter spring container space 2d through the opening in the front edge of the casing 2. When the ends of the shutter spring 4 are then released, the shutter spring 4 expands and the end portions 4a and 4b of the shutter spring 4 are brought into abutment against the respective engagement projections 25 and 35. At this time the projected wall portion 12 prevents the end portion 4b of the shutter spring 4 on the shutter member 3 from expanding over the engagement projection 35 and even if the end portion 4b once abuts against the surface 12 of the inner wall portion 12, it is moved toward the engagement projection 35 to be finally brought into abutment against the engagement projection 35.

When thus incorporating the shutter spring 4 in the casing 2, though the end portion 4a can be surely engaged with the engagement projection 25, the other end portion 4b can miss the engagement projection 35 on the shutter member 3. This is because the end portion 4b sometimes extends straight before the whole spring body expands. By virtue of the projected wall portion 12, such a problem is avoided and correct assembly of the magnetic disc cartridge can be facilitated.

Figure 11:
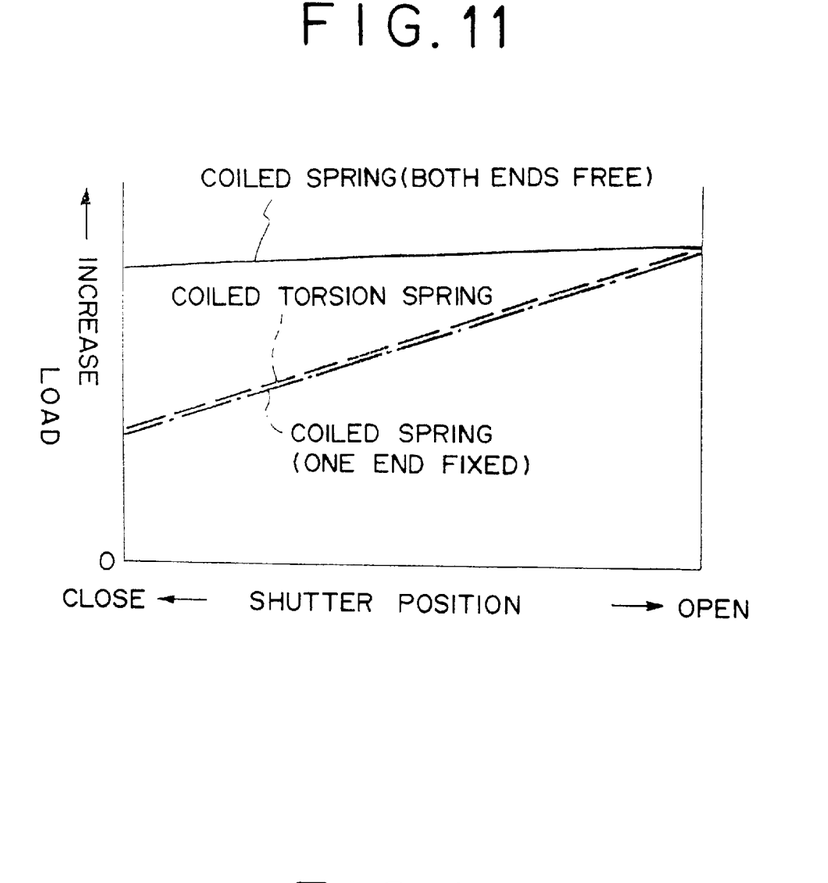
FIG. 11 is a view showing the relation between the form of the shutter spring and the spring properties thereof, and FIG. 12 a front view of an example of a conventional shutter spring.

When the both end portions 4a and 4b of the shutter spring 4 are not constrained as in this embodiment, since bending points are dispersed, the spring properties of the shutter spring 4 become such that they will exert a substantially constant force irrespective of the position of the shutter member 3 or of the amount of deformation thereof as shown by the solid line in FIG. 11.

Third Embodiment

Figure 8:
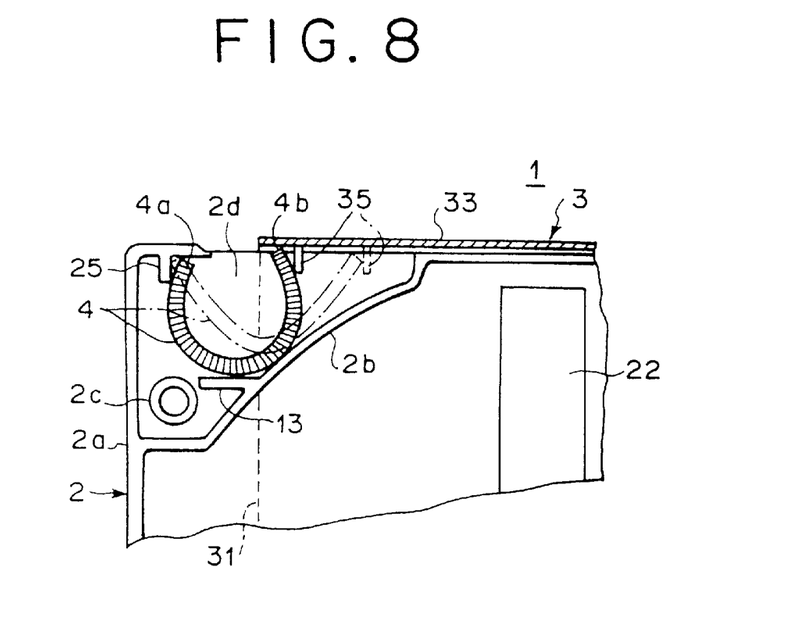
FIG. 8 is a plan view of an important part of the lower shell half of a magnetic disc cartridge in accordance with a third embodiment of the present invention.

A magnetic disc cartridge 1 in accordance with a third embodiment of the present invention will be described with reference to FIG. 8, hereinbelow. The magnetic disc cartridge of this embodiment is characterized by a bottom position limiting member for preventing the end portions 4a and 4b of the shutter spring 4 from being disengaged from the engagement projections on the shutter member 3 and the casing 2.

Also in this embodiment, the end portions 4a and 4b of the shutter spring 4 are only in abutment against the engagement projections 25 and 35 and are not constrained.

In the shutter spring container space 2d formed between the outer peripheral wall 2a and the inner wall 2b of the casing 2, there is formed a bottom position limiting member 13 to be brought into contact with an intermediate portion of the shutter spring 4 when the shutter spring 4 is deflected more than the degree to which the shutter spring 4 is deflected during movement of the shutter member 3 to the opening position at most. The bottom position limiting member 13 is formed integrally with the inner wall 2b and extends substantially in parallel to the direction of movement of the shutter member 3 to prevent the end portions 4a and 4b of the shutter spring 4 from moving away from the front edge of the casing 2 to be disengaged from the engagement projections 25 and 35.

In this embodiment, since the end portions 4a and 4b of the shutter spring 4 are only in abutment against the engagement projections 25 and 35 and are not constrained, when the shutter spring 4 is deflected into a substantially C-shape, for instance, during incorporation of the shutter spring 4 more than the degree to which the shutter spring 4 is deflected during movement of the shutter member 3 to the opening position at most, the end portions 4a and 4b can be moved away from the engagement projections 25 and 35. The bottom position limiting member 13 prevents the end portions 4a and 4b from moving away from the engagement projections 25 and 35, thereby keeping the end portions in abutment against the engagement projections 25 and 35 and ensuring stable opening and closing movement of the shutter member 3.

The bottom position limiting member 13 may be formed separately from the inner wall 2b and may be in the form of, for instance, a pin. Further the bottom position limiting member 13 may be formed in addition to the projected wall portion 12 described above in the second embodiment.

Fourth Embodiment

Figure 9:
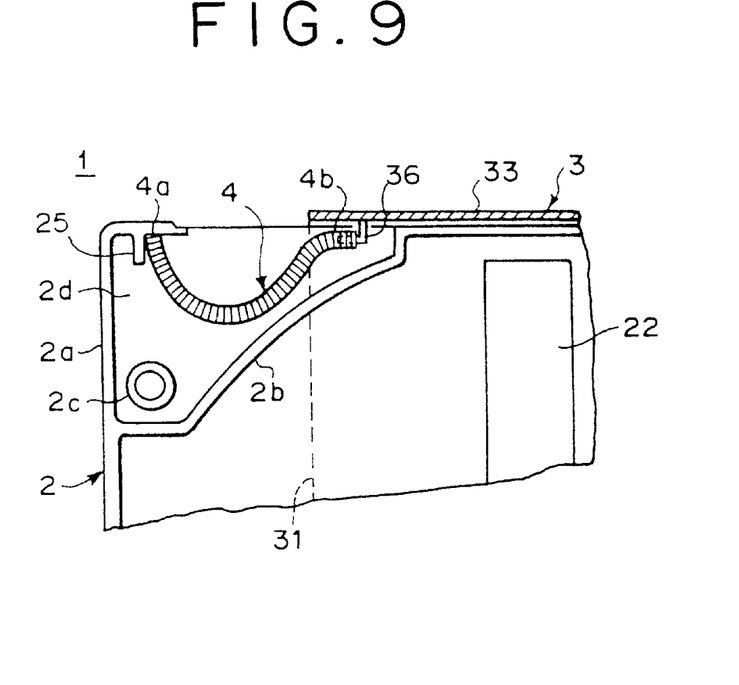
FIG. 9 is a plan view of an important part of the lower shell half of a magnetic disc cartridge in accordance with a fourth embodiment of the present invention.

A magnetic disc cartridge 1 in accordance with a fourth embodiment of the present invention will be described with reference to FIGS. 9 and 10, hereinbelow.

In this embodiment, the end portion 4b of the shutter spring 4 is fixedly held by the shutter member 3.

That is, though the end portion 4a of the shutter spring 4 is in abutment against the engagement projection 25 on the casing 2 as in the preceding embodiments, the end portion 4b is fixedly held by a key-like engagement projection 36 formed on the shutter member 3. Since being fixed to the engagement projection 36, the end portion 4b extends substantially parallel to the direction of movement of the shutter member 3.

Figure 10:
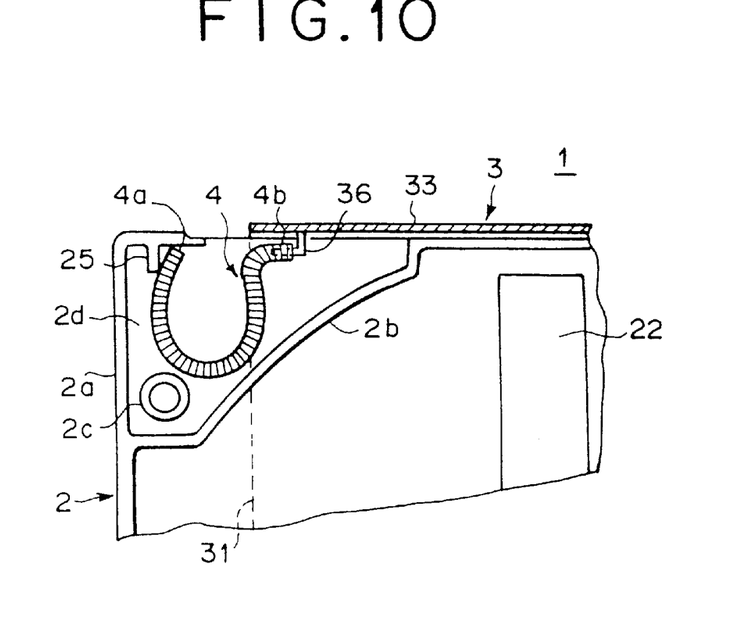
FIG. 10 is a plan view showing the state where the shutter member is opened.

With this arrangement, the shutter spring 4 is deformed into an S-like shape when the shutter member 3 is moved toward the opening position as shown in FIG. 10.

The engagement projection 36 on the shutter member 3 is formed by stamping and erecting a part of the shutter member 3. The end portion 4b of the shutter spring 4 is fixed to the engagement projection 36 by insertion, press fitting, caulking or the like. Incorporation of the shutter spring 4 in the casing 2 is effected with the end portion 4b fixed to the engagement projection 36, whereby incorporation of the shutter spring 4 is facilitated.

The end portion 4b may be held at an angle to the direction of movement of the shutter member 3. Further the engagement projection 36 may be formed separately from the shutter member 3 and fixed to the shutter member 3.

In this embodiment, since the end portion 4b of the shutter spring 4 is fixed to the engagement projection 36 on the shutter member 3, the shutter spring 4 comes to be bent at a relatively fixed point, and spring properties similar to those of the conventional coiled torsion spring can be obtained as shown by the chained line in FIG. 11. That is, in this embodiment, the spring force (load) increases as the shutter member 3 is moved toward the opening position or as the amount of deformation of the shutter spring 4 increases like in the conventional coiled torsion spring and the shutter spring 4 of this embodiment can be used under a condition similar to that of the conventional coiled torsion spring.

What is claimed is:

1. A magnetic disc cartridge comprising:

a casing provided with a magnetic head insertion opening;

a magnetic disc rotatably provided in said casing;

a shutter member for opening and closing the magnetic head insertion opening;

a shutter spring formed entirely of a coiled metal spring which is engaged with the casing at one end and with the shutter member at the other end and which urges the shutter member to the closing position to close the magnetic head insertion opening due to resiliency of said shutter spring generated by deflection thereof;

wherein said shutter spring comprises a first end, a second end, and an intermediate portion, and said shutter spring is deflected at said intermediate portion to urge said shutter member to the closing position;

a first hook connected to said first end of said shutter spring; and a second hook connected to said second end of said shutter spring;

wherein said first hook is engaged with said casing, and said second hook is engaged with said shutter member.

2. A magnetic disc cartridge comprising:

a casing provided with a magnetic head insertion opening;

a magnetic disc rotatable provided in said casing;

a shutter member for opening and closing the magnetic head insertion opening;

a shutter spring formed entirely of a coiled metal spring which is engaged with the casing at one end and with the shutter member at the other end and which urges the shutter member to the closing position to close the magnetic head insertion opening due to resiliency of said shutter spring generated by deflection thereof;

wherein said shutter spring comprises two ends and an intermediate portion, and said shutter spring is deflected at said intermediate portion to urge said shutter member to the closing position;

wherein the casing is provided with an outer peripheral wall and an inner wall which extends along an outer peripheral edge of the magnetic disc;

said casing comprising:

a shutter spring container space for containing therein the shutter spring, said shutter spring container space being formed between the outer peripheral wall and the inner wall of the casing;

an engagement projection formed on the shutter member for engagement with one end of the shutter spring; and a projected wall portion which projects from the inner wall of the casing defining the shutter spring container space, toward a position where the engagement projection on the shutter member is located when the shutter member is in the closing position.

3. The magnetic disc cartridge as defined in claim 2 in which an end of the projected wall portion is spaced from the engagement projection by a distance which is sufficient to prevent the wall portion from interfering with opening and closing of the shutter member and is smaller than the diameter of the shutter spring.

4. The magnetic disc cartridge as defined in claim 2, wherein a side surface of the projected wall portion facing the shutter spring is one of substantially in alignment with a shutter spring side surface of the engagement projection on the shutter member and shifted toward the shutter spring.

5. The magnetic disc cartridge as defined in claim 2, wherein the projected wall portion is formed integrally with said inner wall and a shutter spring side surface thereof extends perpendicular to one of a direction of movement of the shutter member and obliquely toward the engagement projection of the shutter member.

6. The magnetic disc cartridge as defined in claim 2, wherein an engagement projection is formed on a front edge of the casing to project therefrom so that the one end of the shutter spring abuts against the engagement projection and a shutter member side surface of the engagement projection is one of inclined and curved so that a free end portion of the side surface of the engagement projection approaches the shutter member.

7. A magnetic disc cartridge comprising:

a casing provided with a magnetic head insertion opening;

a magnetic disc rotatably provided in said casing;

a shutter member for opening and closing the magnetic head insertion opening;

a shutter spring formed entirely of a coiled metal spring which is engaged with the casing at one end and with the shutter member at the other end and which urges the shutter member to the closing position to close the magnetic head insertion opening due to resiliency of said shutter spring generated by deflection thereof;

wherein said shutter spring comprises two ends and an intermediate portion, and said shutter spring is deflected at said intermediate portion to urge said shutter member to the closing position;

wherein the casing is provided with an outer peripheral wall and an inner wall which extends along an outer peripheral edge of the magnetic disc;

said casing comprising:

a shutter spring container space for containing therein the shutter spring, said shutter spring container space being formed between the outer peripheral wall and the inner wall of the casing;

engagement projections formed on the shutter member and the casing, respectively, for engagement with the two ends of the shutter spring; and a bottom position limiting member formed in the shutter spring container space to be brought into contact with said intermediate portion of the shutter spring when the shutter spring is deflected more than a degree to which the shutter spring is deflected during movement of the shutter spring to the opening position at most, thereby preventing the two ends of the shutter spring from being disengaged from the engagement projections on the shutter member and the casing.

8. A magnetic disc cartridge as defined in claim 7, wherein the bottom position limiting member extends integrally from the inner wall.

9. A magnetic disc cartridge comprising:

a casing provided with a magnetic head insertion opening;

a magnetic disc rotatably provided in said casing;

a shutter member for opening and closing the magnetic head insertion opening;

a shutter spring formed entirely of a coiled metal spring which is engaged with the casing at one end and with the shutter member at the other end and which urges the shutter member to the closing position to close the magnetic head insertion opening due to resiliency of said shutter spring generated by deflection thereof;

wherein said shutter spring comprises two ends and an intermediate portion, and said shutter spring is deflected at said intermediate portion to urge said shutter member to the closing position;

wherein the shutter member is provided with an engagement projection which is engaged with one end of the shutter spring, and the one end of the shutter spring is fixedly held on the engagement projection so that the one end extends one of substantially in parallel and at an angle to a direction of movement of the shutter member.

10. A magnetic disc cartridge comprising:

a casing provided with a magnetic head insertion opening;

a magnetic disc rotatably provided in said casing;

a shutter member for opening and closing the magnetic head insertion opening;

a shutter spring, comprising two ends and an intermediate portion, said shutter spring being formed in along its entire length of a coiled metal spring in a substantially U-shape, one end of said coiled metal spring which is engaged with the casing, and the other end of the coiled metal spring which is engaged with the shutter member, said shutter spring urging the shutter member to the closing position to close the magnetic head insertion opening due to resiliency of said shutter spring generated by deflection thereof;

wherein said shutter spring is deflected at said intermediate portion to urge said shutter member to the closing position.

* * * * *